United States Patent
MacDonald (10) Patent No.: US 6,866,271 B2
(45) Date of Patent: Mar. 15, 2005

(54) MARINE SHAFT SEAL WITH LIP SEAL, BEARING AND GASKET

(75) Inventor: George MacDonald, Franklin, NH (US)

(73) Assignee: Duramax Marine, LLC, Hiram, OH (US)

( * ) Notice: Subject to any disclaimer, the term of this patent is extended or adjusted under 35 U.S.C. 154(b) by 0 days.

(21) Appl. No.: 10/358,577

(22) Filed: Feb. 5, 2003

(65) Prior Publication Data

US 2003/0173744 A1 Sep. 18, 2003

Related U.S. Application Data

(60) Provisional application No. 60/354,909, filed on Feb. 5, 2002.

(51) Int. Cl.[7] .................................................. F16J 3/00
(52) U.S. Cl. ........................ 277/634; 277/353; 277/391; 277/394; 277/549; 277/561
(58) Field of Search ................................ 277/346, 353, 277/391, 394, 500, 503, 504, 549, 561, 634

(56) References Cited

U.S. PATENT DOCUMENTS

| | | | |
|---|---|---|---|
| 2,115,346 A | | 4/1938 | Summers |
| 2,122,378 A | | 6/1938 | McMormack |
| 2,397,290 A | | 3/1946 | Rasmussen |
| 3,081,099 A | | 3/1963 | Walker et al. |
| 3,526,408 A | | 9/1970 | Tracy |
| 3,529,839 A | | 9/1970 | Greiner et al. |
| 3,565,447 A | * | 2/1971 | Joachim et al. ............. 277/504 |
| 3,599,990 A | | 8/1971 | Greiner et al. |
| 3,751,046 A | * | 8/1973 | Golubev et al. ............ 277/393 |
| 3,822,066 A | | 7/1974 | Keys |
| 3,975,028 A | * | 8/1976 | Satsumabayashi et al. .. 305/103 |
| 4,085,941 A | | 4/1978 | Wilkinson et al. |
| 4,095,807 A | | 6/1978 | Jandt et al. |
| 4,165,081 A | | 8/1979 | F'Geppert |
| 4,229,010 A | * | 10/1980 | St. Laurent, Jr. ........... 277/634 |
| 4,293,304 A | | 10/1981 | Sandström et al. |
| 4,429,884 A | | 2/1984 | Matsumoto |
| 4,451,049 A | | 5/1984 | Charhut |
| 4,482,159 A | | 11/1984 | Ishitani et al. |
| 4,648,605 A | | 3/1987 | Marsi |

(List continued on next page.)

FOREIGN PATENT DOCUMENTS

| | | |
|---|---|---|
| DD | 1269852 | 6/1968 |
| GB | 508776 | 9/1939 |

OTHER PUBLICATIONS

"Stuffing Box Black and Blues: OEM Alert," *Marine Business Journal*, J. Kalvin, Oct. 1993.

(List continued on next page.)

*Primary Examiner*—Alison Pickard
*Assistant Examiner*—Enoch Peavey
(74) *Attorney, Agent, or Firm*—D. Peter Hochberg; Sean Mellino; Katherine R. Vieyra (57) ABSTRACT

A sealing device for use with a drive shaft of a water vessel. The sealing device comprises a housing for a seal and bearing, a compression ring, a lip seal flange attachment and a diaphragm for tracking the movement of the shaft. The diaphragm is made of a resilient, flexible material and is operatively connected to the seal housing. In operation, the diaphragm tracks the motion of the drive shaft so that the drive shaft may move freely in the hull of the vessel. The diaphragm allows the rigid seal housing to also move in response to any axial, lateral or circular-axial (wobble-like) movement of the shaft so that a constant seal around the shaft is provided.

17 Claims, 7 Drawing Sheets

U.S. PATENT DOCUMENTS

| | | | |
|---|---|---|---|
| 4,732,396 A | | 3/1988 | Brigham et al. |
| 4,936,593 A | | 6/1990 | Finney |
| 4,997,191 A | | 3/1991 | Warner |
| 5,013,050 A | | 5/1991 | Curtis |
| 5,014,998 A | * | 5/1991 | Lauridsen .................. 277/504 |
| 5,199,719 A | | 4/1993 | Heinrich et al. |
| 5,209,497 A | | 5/1993 | Von Bergen et al. |
| 5,340,121 A | * | 8/1994 | Lewis et al. ................ 277/393 |
| 5,639,098 A | | 6/1997 | MacDonald |
| 5,678,947 A | * | 10/1997 | Urbach et al. .............. 403/288 |

OTHER PUBLICATIONS

"Boatkeeper–No More Stuffing Boxes?" by Bernard Gladstone, *Motor Boating & Sealing/Boatkeeper*, Nov., 1993.

Advertisement: "Lasdrop Shaft–Seal/'The Dripless and Maintenance–Free Shaft Seal'".

Advertisement: "PSS Packless Sealing System/Dripless, Maintenance–Free Stuffing Box Replacement System for Shafts from ¾ to 8"".

Advertisement: "PSS Shaft Seal Stuffing Box Replacement Unit".

Advertisement: MAC–SEAL.

Advertisement: "Norscot Propeller Shaft Seal".

Advertisement: "Strong Seal Self Aligning Shaft Seal".

Advertisement: "Real Seal".

Advertisement: "Exalto Hollex Seals".

Advertisement: "Max–Prop V.P.".

Advertisement: "TrellCom—Marine Shaft Seals".

Advertisement: Overview of the Strong® Shaft Seal System.

Advertisement: "Leasdrop Shaft Seal".

Advertisement: "Lasdrop Leakbusters".

\* cited by examiner

MARINE SHAFT SEAL WITH LIP SEAL, BEARING AND GASKET

CROSS REFERENCE TO RELATED APPLICATION

This application claims priority of U.S. Provisional Application No. 60/354,909, filed Feb. 5, 2002, under Title 35, United States Code, Section 119(e).

FIELD OF THE INVENTION

The present invention relates generally to a device for creating a fluid-tight seal around a rotatable shaft and a structure through which the shaft passes. More specifically, the present invention relates to a watertight seal between the propeller drive shaft in a water vessel and an aperture in the hull of the vessel through which the shaft passes.

DESCRIPTION OF THE PRIOR ART

Watertight seals through which pass a rotatable shaft are routinely used with water vessels. Such seals must be used to retain water on one side of the vessel. For example, a propeller drive shaft extends from the interior of the hull of the vessel to the exterior fluid environment, and passes through the aperture in the hull of the boat. It is imperative that the aperture is sealed in order to prevent water from entering the hull of the vessel through the aperture.

One method commonly used in the art is the use of a stuffing box. Stuffing boxes generally consist of a bronze or other metallic housing or plate which is fastened over the aperture in the hull of the vessel. A stuffing box also includes a hollow, cylindrical tube which extends into the vessel. The propeller drive shaft is received in the cylindrical tube and passes through the housing and through the aperture. A stuffing box application for a pleasure craft generally includes a metallic nut which can be threadingly received in the cylindrical tube and inserted on the propeller shaft. A sealing material or gland, such as packing rings, which can be wax or graphite impregnated braided flax rope are generally also included. The packing rings are cut and placed around the propeller drive shaft between the metallic nut and inside the cylindrical tube. The nut is then threaded into the cylindrical tube and tightened against the packing rings, compressing the packing ring against the propeller drive shaft to create a watertight seal.

One significant problem with stuffing boxes is that the packing seals against the rotating shaft can cause wear damage to the shaft. Another is that stuffing boxes need to be tightened to keep water from entering the vessel. Due to the difficulty and inconvenience in accessing the stuffing box, most vessel operators do not adjust it as frequently as they should. As a result, excess water often enters the vessel when it is docked, because the stuffing box may still be loose, and a bilge pump is used to pump the water outboard. Bilge pumps can fail or malfunction, however, and most inboard water damage to vessels occurs because water enters through the packing gland, and the bilge pump subsequently malfunctions.

Stuffing boxes also need to be constantly adjusted. When the propeller shaft is operating, the packing gland should be somewhat loose to permit adequate amounts of water to enter the stuffing box in order to moisten the packing and to cool and lubricate the rotating shaft. If no water enters, the rotating shaft is not properly lubricated, increasing friction between the shaft and packing and causing excess wear to both. This can result in either, or both, items breaking down and needing repair or replacement.

In addition, stuffing boxes tend to leak, even when properly adjusted, as the compressed flax is not totally impervious to water. Stuffing boxes are also relatively rigid and there is very little flexibility transverse to the axis of the shaft in a packing gland. The drive shaft tends to wobble and vibrate while in use which can create gaps in the seal if the seal is not flexible with the shaft movement.

Due to the rotation of the shaft within the stuffing box, the packing tends to wear out quickly. The wearing of the packing will result in water entering the vessel which can cause expensive damage and vessel maintenance, both in the form of repairs to the vessel and frequent replacement of the packing. In this respect, when the packing is replaced, the vessel may need to be lifted out of the water which is an expensive, time-consuming operation. Moreover, even when used and maintained properly, stuffing boxes need to be repacked about every six months to two years, depending on the amount of hours of use and operating conditions.

Mechanical seals have been developed to overcome the problems associated with stuffing boxes. For example, mechanical seals need no repacking, require little maintenance, and are much more efficient at preventing water leakage into the bilge and other vessel areas. The most common mechanical seals include a lip seal and a face seal or surface seal.

A typical lip seal is a flexible, stationary annular seal, generally made of rubber, which tightly surrounds the propeller drive shaft creating a seal while allowing free shaft rotation. One problem with the lip seal is that it tends to wear grooves in the drive shaft. A groove in the shaft tends to allow water to leak into the vessel. A groove, or grooves, tends to also weaken the shaft, causing it to have to be repaired or replaced.

Lip seals also have a rigid, or semi-rigid, sleeve through which the propeller shaft passes. As a result of the forward and reverse movement of the propeller, the propeller shaft undergoes constant vibration or wobbling. This constant vibrating or wobbling motion of the shaft tends to place high pressure on the lip seal as the rigid or semi-rigid sleeve is unable to properly move with the motion of the shaft. The increased load in the lip seal can cause premature failure of the seal, resulting in premature repair or replacement.

Alternatively, a face seal comprises two finely machined sealing surfaces pressed together to form a watertight seal. One major advantage of a face seal is that it does not seal against the propeller shaft. This allows the shaft to rotate with less resistance than a lip seal or stuffing box would.

Of course face seals have their own disadvantages. For example, it is critical to maintain the proper compression between the two seals. The compression may lessen due to the movement of the shaft in its axial direction, as a result of the forward or reverse movement of the propeller. A weakened compression between the two seals will result in water leakage into the vessel, thereby causing vessel damage. Alternatively, too much pressure between the seal ring and the friction ring causes undue wear of the seal.

Prior art seals also employ a rigid or semi-rigid hose extending from the seal through which passes the propeller shaft. The hose is used to track the movement of the shaft and is designed to move with the shaft as it wobbles during use. One significant problem with this design is that the hose is rigid or semi-rigid and the constant movement of the shaft creates a pressure load on the hose, thereby causing the hose to break down over time and needing replacement or repair.

U.S. Pat. No. 5,639,098 (MacDonald) provides an adjustable sealing device for sealing between a rotatable drive shaft and the aperture in a vessel through which passes the drive shaft. The device as described in MacDonald '098 is a rigid one and comprises an appropriate adapter which is connected to an adapter ring which in turn is connected to a sea gasket, which in turn is connected to a slide ring and a friction ring. Between the slide ring and the friction ring is a biasing means, such as a tension spring, for loading or biasing the friction ring in order to create a watertight seal. The employment of a tension spring allows the rigid device to compress with the movement of the propeller drive shaft. One disadvantage of the device as described in MacDonald '098 is that it is intended to be used solely with large vessels, such as commercial vessels, and is not adaptable or may be too costly for use with smaller vessels, and non-commercial or recreational vessels.

There is an unsatisfied need for a relatively inexpensive improved propeller shaft seal system having greater flexibility relative to the propeller shaft, particularly for use with smaller vessels having propeller shaft diameters of less than 3 inches.

SUMMARY OF THE INVENTION

In accordance with the preferred embodiments of the present invention, there is provided a shaft seal system for use with a vessel, such as a recreational or noncommercial water vessel (or in some instances small commercial vessels such as some fishing boats), where the drive, or propeller shaft extends from an inboard engine to gear box, through the hull or bulkhead, to an outboard drive means, such as a propeller. The shaft seal system prevents the flow of water through the opening in the hull or bulkhead, into the vessel and out of the confines of the system. Considering the system from aft to forward, there is provided an appropriate adapter that fills the hull opening, and which is connected to a seal housing which is connected to a sea gasket or diaphragm, which in turn is connected to a lip seal flange attachment. The seal housing has a lip seal, which will be discussed in greater detail below, and the lip seal flange attachment is a rearwardly extending body which goes around the shaft. The sea gasket is attached to the seal housing and there is a compression ring therebetween to stabilize the sea gasket during operation of the propeller drive shaft. The seal housing is held in place with the sea gasket by a mini tie lock and the sea gasket is held in place between the compression ring and the lip seal flange attachment by threaded screws or the like.

The unit is rigid with flexible and resilient components and it will not be disrupted if it is negatively impacted during use. This is an important feature because one of the causes of catastrophic failures of the prior art devices, other than that of MacDonald '098, is that they constituted a fully rigid device with no resilient components.

The main feature of the present invention is the sea gasket and its use with the seal housing. The sea gasket can be made of any material that is resistant to water exposure, is flexible, and is highly resilient, such as rubber or a rubber-like material, a thermoplastic or a thermoset. The sea gasket is designed to have a base that is static and immovable, but has a body that is movable and is connected to the seal housing. As will be discussed later, the propeller shaft is contained within the center cavity of the seal housing, compression ring, sea gasket and lip seal flange attachment. During operation of the propeller drive shaft, the propeller drive shaft tends to move forward and backward axially as well as in a radial fashion. The flexibility of the sea gasket allows it to track each and every movement of the shaft during its operation while maintaining a static foundation and more importantly, allowing the seal housing to maintain a constant seal around the propeller drive shaft as the seal housing moves in conjunction with the sea gasket. This is important in that the overall rigidity and durability of the device is not impaired or diminished.

It is an object of the present invention to prevent water from entering a vessel and leaving the confines of the shaft seal system where the vessel has a propeller shaft extending from an inboard motor or gear box to an outboard propeller.

It is another object of the present invention to provide a system for preventing water from entering a vessel having a shaft which extends through the hull or bulkhead of the vessel, even if the shaft of the vessel changes its position radially or axially.

Still yet another object of the present invention is to provide a system for preventing water from entering a vessel having a propeller shaft which extends through the hull or bulkhead of the vessel, where the system is rigid with flexible and resilient components and can withstand impact forces which might damage or dislodge other shaft-sealing systems.

Yet another object of the present invention is to provide a water-sealing system for a vessel which remains effective even if portions of the system become misaligned during operation of the system.

It is an object of the present invention to provide a system as described above which is compressible and expandable in an axial or radial direction in order to adjust for axial and radial movement of the drive shaft during the operation of the vessel to prevent damage to the sealing components of the system and to maintain the integrity of the seal.

Another object of the present invention is to provide a system for sealing against a flow of water where the longitudinal axis of the drive shaft moves off-center from the longitudinal axis of the system.

A further object of the present invention is to provide a fluid-sealing device for a vessel having a shaft which runs through the hull or bulkhead of the vessel which can be used with many different types of apparatus for receiving a shaft where it extends through the hull or bulkhead.

Yet another object of the present invention is to provide a fluid-sealing device for use with a vessel having a shaft which extends from an inboard motor or gear box to a propeller outboard of the vessel, which can easily be used with various types of thru-hull adapter rings, flange adapters, hose adapters, stem tube clamp adapters and the like through which propeller shafts extend through the hull or bulkhead.

Still yet another object of the present invention is to provide a device as described above to which adapters may be attached, each respective adapter adapting the device for mounting to a different hull aperture configuration.

Another object of the present invention is to provide a sealing device as described above wherein the sea gasket is made of a flexible, yet resilient rubber or rubber like material.

Yet another object of the present invention is to provide a sealing device as described above wherein the seal housing, compression ring, and lip seal flange attachment are made of a durable material such as a plastic, metal or fiberglass material.

Another object of the present invention is to provide a water-seal apparatus for the shaft of a vessel which is safe in operation, durable and easy to make, uses known components and raw materials, and which furthermore is effective, efficient and reliable in operation.

Another object of the present invention is to provide a shaft seal system which offers the features of that described in U.S. Pat. No. 5,639,098 (MacDonald).

Other objects of the present invention will become apparent from the description to follow and from the appended claims.

DETAILED DESCRIPTION OF THE PREFERRED EMBODIMENTS

The present invention is now described with reference to the drawings, wherein like reference numerals are used to refer to like elements throughout. In the following description, for purposes of explanation, numerous specific details are set forth in order to provide a thorough understanding of the present invention. It will be evident, however, to one skilled in the art that the present invention may be practiced without these specific details.

Figure 1:
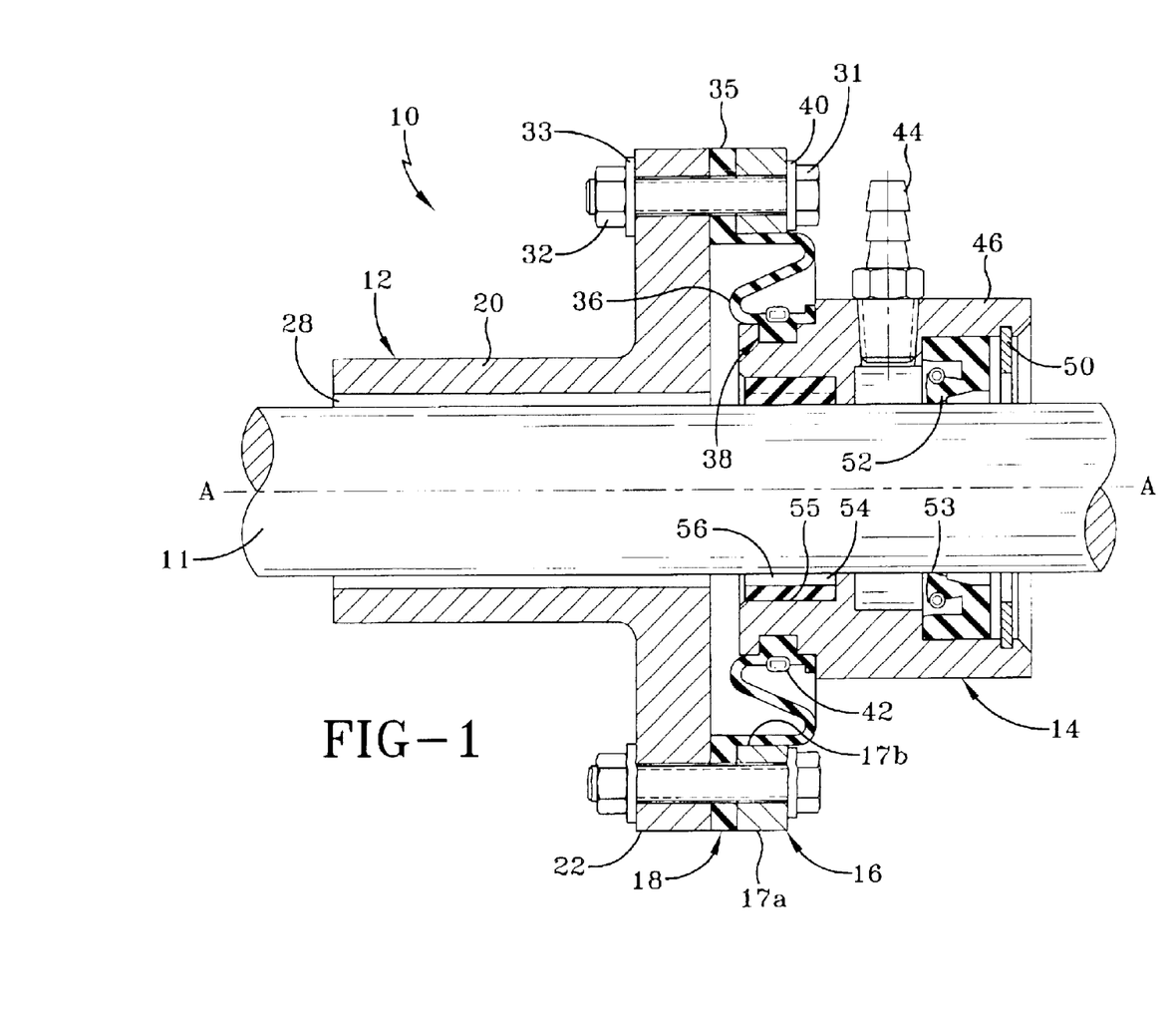
FIG. 1 is a side, cross-sectional view of the water-sealing system of the present invention.
Figure 2:
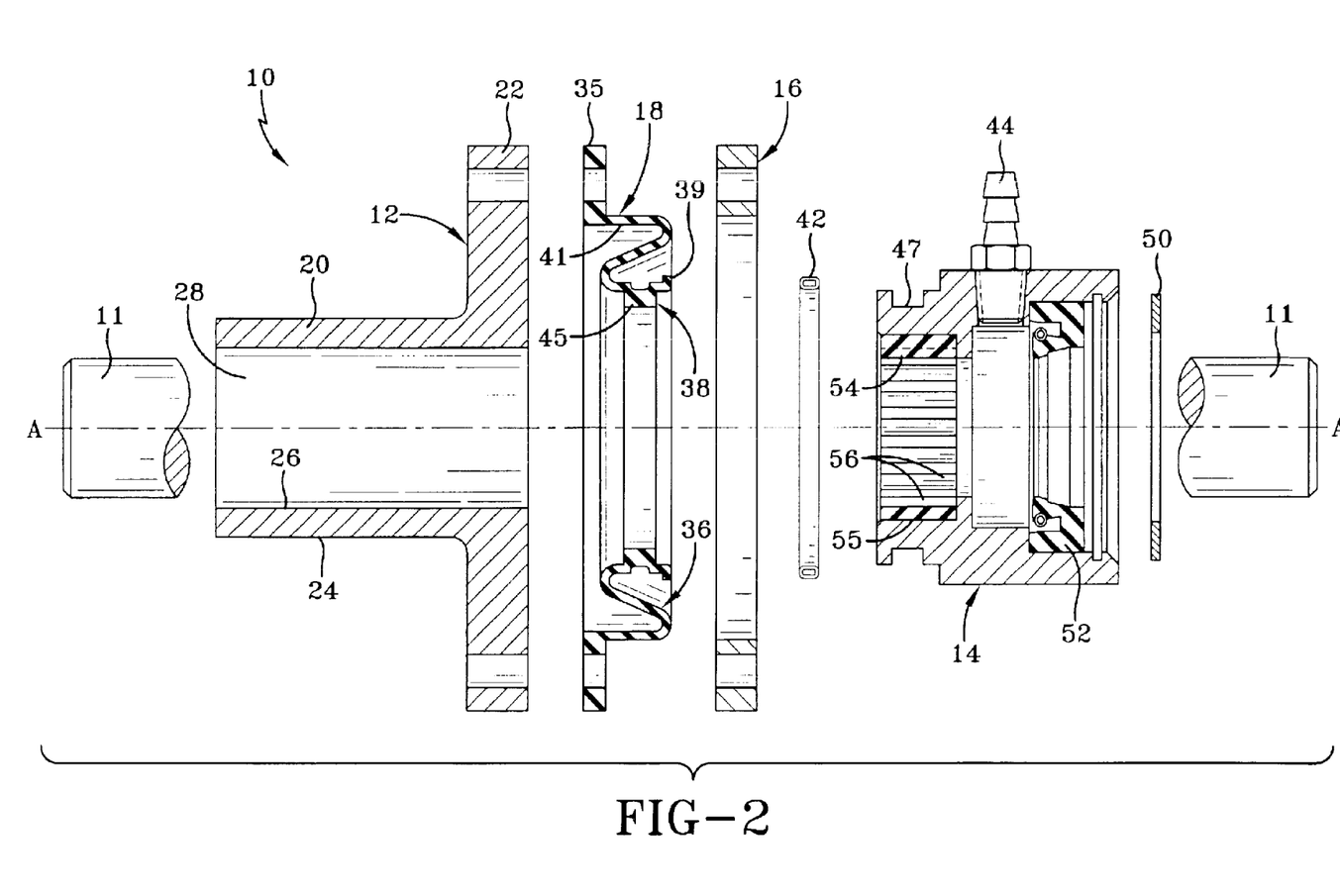
FIG. 2 is an exploded view of the water-sealing system as shown in FIG. 1.

Turning now to FIGS. 1 and 2, the shaft-sealing device of the present invention is shown and referred to generally at numeral 10. Shaft sealing device 10 is intended to provide a seal to prevent fluid, such as seawater, from entering the hull of a vessel. A propeller shaft 11 of the vessel is connected to the engine (not shown) of the vessel at one end and a propeller (not shown) of the vessel at the other end. Shaft sealing device 10 comprises a lip seal flange attachment 12, a seal housing 14, a compression ring 16 and a diaphragm or sea gasket 18. Sealing device 10 has a hollow shaft passageway 28 (FIG. 3b) therethrough with a generally longitudinal axis A, which is also the axis of rotation for propeller shaft 11. Shaft passageway 28 has a diameter to accommodate the diameter of propeller shaft 11 so that a secure engagement between shaft sealing device 10 and propeller shaft 11 is provided, while allowing for proper rotation of shaft 11.

Figures 3A, 3B, 3C:
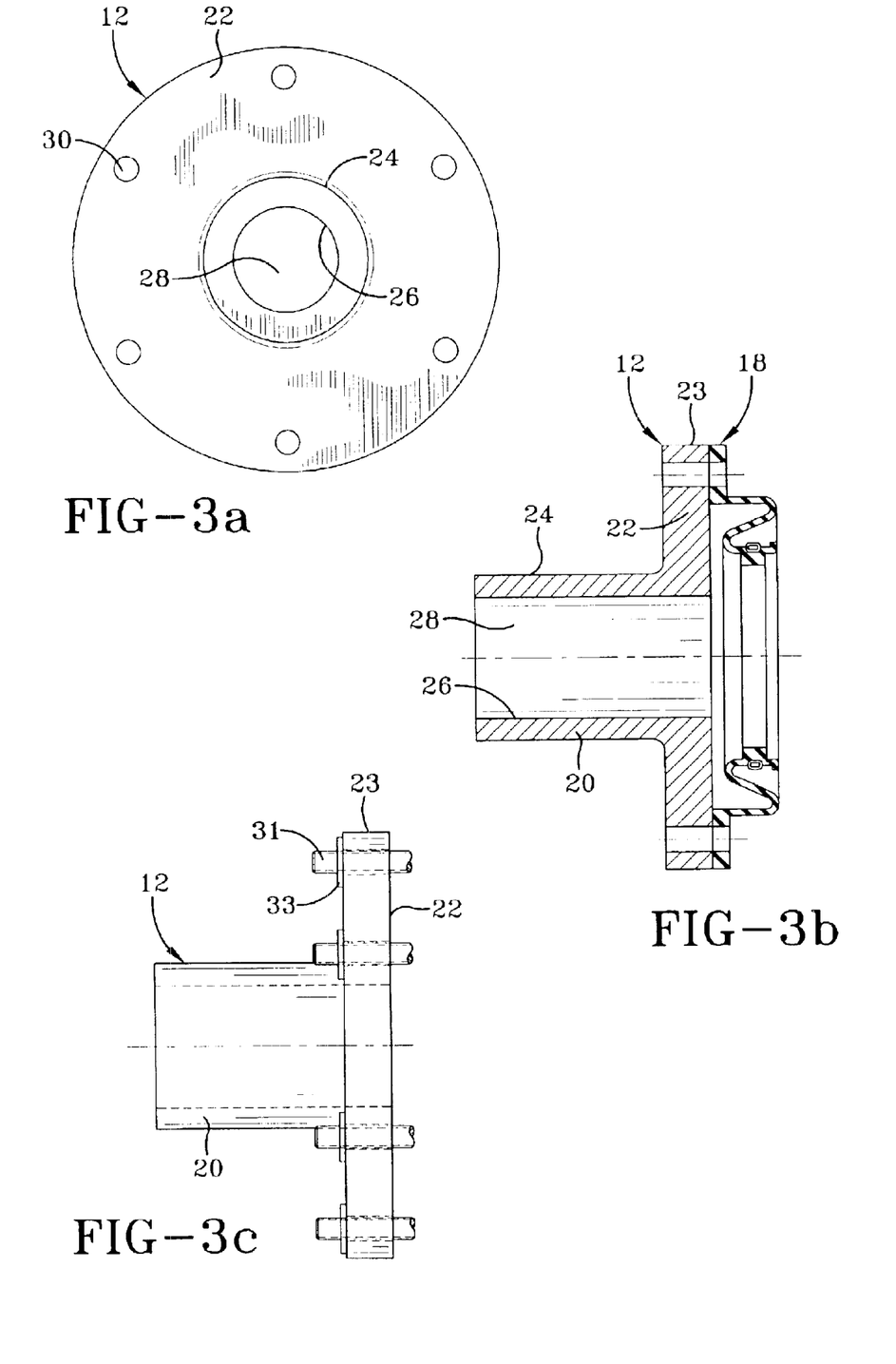
FIG. 3a is front view of the lip seal flange attachment of the water-sealing system as shown in FIG. 1.
FIG. 3b is a side, cross-sectional view of the lip seal flange attachment of the water-sealing system as shown in FIG. 1.
FIG. 3c is a side view of the lip seal flange attachment of the water-sealing system as shown in FIG. 1.

Lip seal flange attachment 12 is shown best in FIGS. 2, 3a and 3b. Lip seal flange attachment 12 generally comprises an elongated cylindrical aft tube end portion 20 having a relatively small outer diameter. Tube end portion 20 also comprises a flat fore wall end portion 22 having a relatively large outer diameter. Tube end portion 20 has an annular outer surface 24 and an annular inner surface 26. Inner surface 26 defines a generally cylindrical cavity that serves as a part of shaft passageway 28. Wall end portion 22 of lip seal flange attachment 12 has an annular outer surface 23 having a thickness of about 0.375-inch for a shaft seal device for accommodating various shaft sizes, the shaft diameter generally not exceeding 3 inches. Wall end portion 22 also comprises a plurality of receiving holes 30 (FIG. 3a), each one of which is adapted to receive a securing post 31 (FIG. 3c), such as a bolt, screw, or other securing device. Receiving holes 30 may be threaded or non-threaded depending on the type of securing post 31 employed. In some instances, as in that shown in FIG. 1, posts 31 are threaded bolts which are held in place with nuts 32 and washers 33. Receiving holes 30 are preferably spaced equidistant from each other. Lip seal flange attachment 12 is made of a rigid material that is resistant to and non-corrosive in water, especially seawater, such as a metal, fiberglass, thermoset or thermoplastic.

Figure 4A:
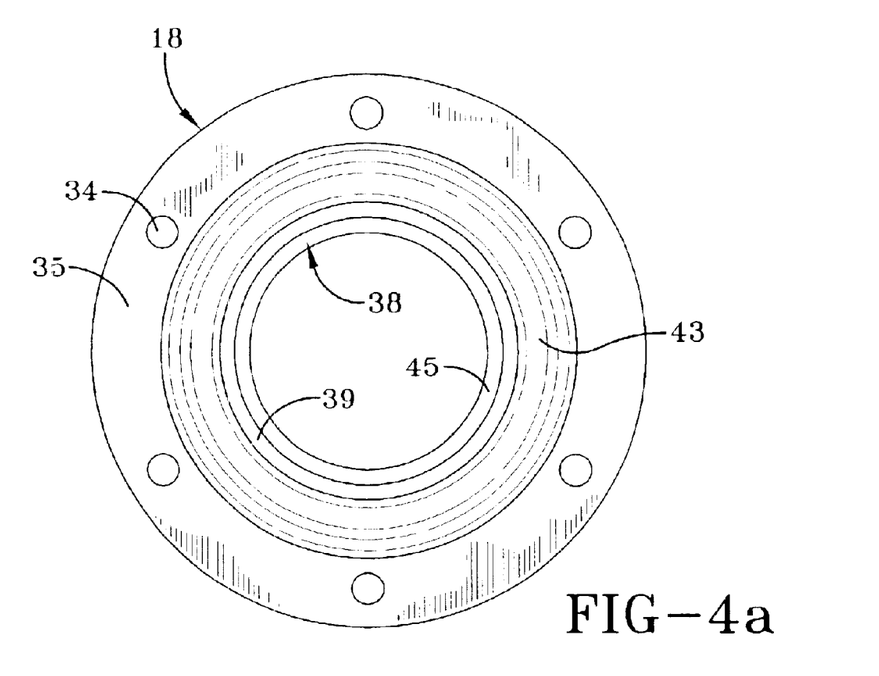
FIG. 4a is a front view of the sea gasket of the water-sealing system as shown in FIG. 1.
Figure 4B:
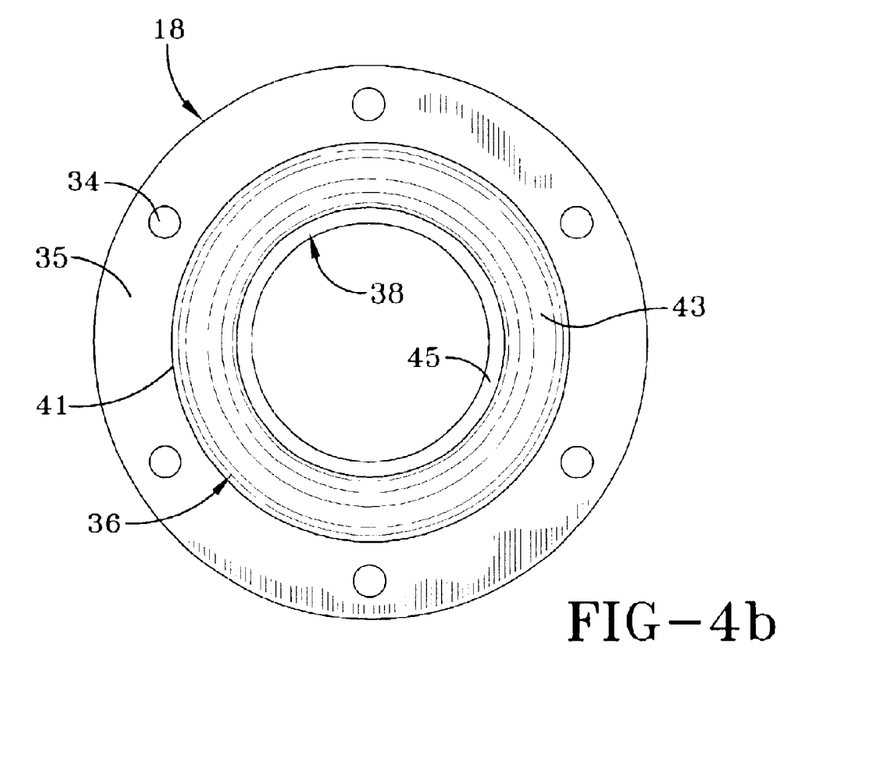
FIG. 4b is a rear view of the sea gasket of the water-sealing system as shown in FIG. 1.
Figures 5, 6:
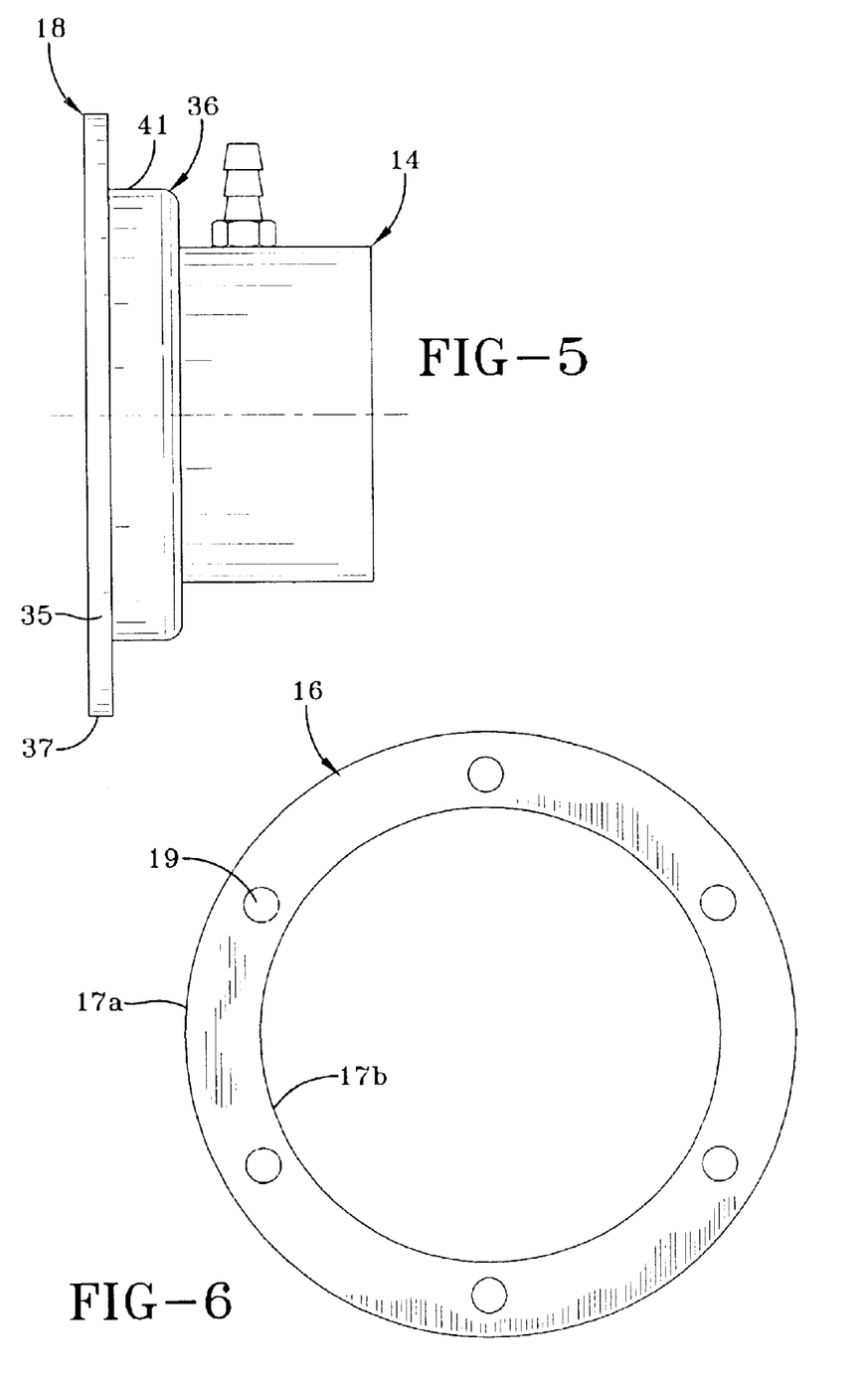
FIG. 5 is a side view of the water-sealing system as shown in FIG. 1.
FIG. 6 is a front view of the compression ring of the water-sealing system as shown in FIG. 1.

Sea gasket 18 is best viewed in FIGS. 4a, 4b and 5. Sea gasket 18 is made of a flexible, resilient material that is resistant to and non-corrosive in water, especially seawater, such as rubber or rubber-like material, a thermoplastic or a thermoset. Sea gasket 18 also contains a plurality of receiving holes 34 adapted to receive a plurality of the same securing posts 31 which extend through the receiving holes 30 of lip seal flange attachment 12. The plurality of receiving holes 34 on sea gasket 18 are of the same quantity as those on lip seal flange attachment 12, and are spaced apart from each other at the same distance as those on lip seal flange attachment 12, thereby corresponding with those on lip seal flange attachment 12.

Sea gasket 18 includes a radial base 35 and a convoluted body 36 extending upwardly from radial base 35, which are also shown in FIG. 1. Convoluted body 36 includes an annular neck portion 41 and an annular foot portion 38. The engagement between neck portion 41 and foot portion 38 defines a convolution 43 (FIG. 4a). The plurality of securing holes 34 are located near the edge of base 35. Base 35 is generally perpendicular to the axis of shaft sealing device 10. The edge of base 35 is generally at about the same distance from the shaft as the edge of lip seal flange attachment 12.

Annular foot 38 portion includes a lipped outer edge 39. Lipped outer edge 39 is adapted to engage with the bottom surface of seal housing 14. In other words, lipped outer edge 39 serves as a support for the bottom of seal housing 14 when housing 14 and sea gasket 18 are secured together. Seal housing 14 will be explained in greater detail infra. The outer annular surface 37 of base 35 is substantially flush with the outer annular surface 17a of compression ring 16 and the same outer surface 37 of base 35 is also substantially flush with the outer annular surface 23 of lip seal flange attachment wall end portion 22. A securing device, such as a mini tie lock 42 (FIGS. 1 and 2), secures the portion of convoluted body 36 that includes annular foot 38 to the rearward portion of seal housing 14 in a fluid tight manner. Any other securing device common to the art may also be employed.

The bottom of base 35 abuts a corresponding surface of wall end portion 22. Additionally, the top surface of base 35 directly abuts a corresponding surface of compression ring 16.

Figure 7A:
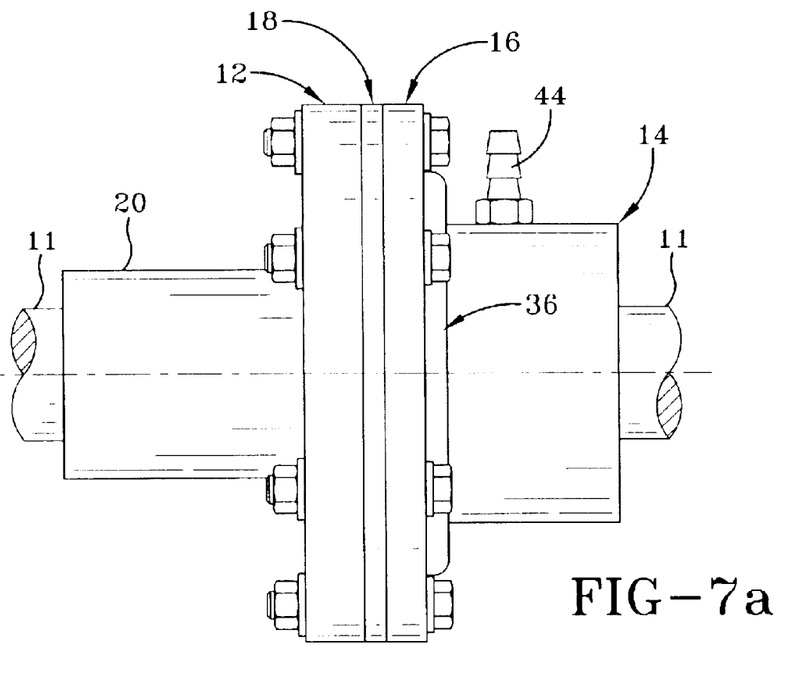
FIG. 7a is a side view of the water-sealing system as shown in FIG. 1, having the sea gasket in a compressed state.
Figure 7B:
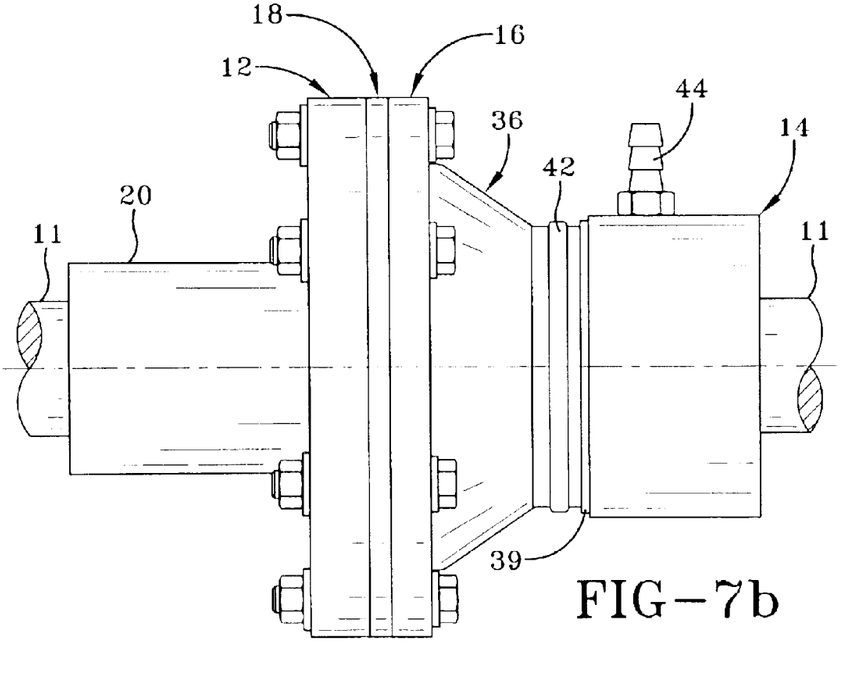
FIG. 7b is a side view of the water-sealing system as shown in FIG. 1, having the sea gasket in an expanded state.

Turning now to FIG. 7a, shaft seal assembly 10 is shown having sea gasket 18 with body 36 in a compressed position where lip seal housing 14 is in close longitudinal proximity to lip seal flange attachment 12. Body 36 is adapted to be able to extend into an extended position, where housing 14 is disposed away from attachment 12, as shown in FIG. 7b, and resilient enough so body 36 can return to a compressed position, or any other position therebetween. This feature allows sea gasket 18 to move about axially or radially, i.e. with the movement of shaft 11 through sealing device 10.

Compression ring 16 is best seen in FIGS. 2, 6, 7a, and 7b. Compression ring 16 comprises a durable, non-flexible material that is resilient to seawater, namely the same material that comprises lip seal flange attachment 12 and seal housing 14. Compression ring 16 has an annular outer surface 17a and an annular inner surface 17b. The edge of compression ring 16 is located at about the same distance away from propeller shaft as lip seal flange attachment 12 and sea gasket 18. Therefore, each respective outer edge of lip seal flange attachment 12, compression ring 16 and sea gasket 18 are in the same cylindrical projection.

Compression ring 16 also contains a plurality of receiving holes 19 (FIG. 6). Receiving holes 19 are adapted to receive the same plurality of securing posts 31 which extend through receiving holes 30 and 32 of lip seal flange attachment 12 and sea gasket 18 respectively. Receiving holes 19 on compression ring 16 are of the same number as on lip seal flange attachment 12 and sea gasket 18 and are aligned to correspond to those on lip seal flange attachment 12 and sea gasket 18. Inner surface 17b defines a cavity having a diameter so that inner surface 17b abuts convoluted body 36 of sea gasket 18 and directly surrounds body 36 of sea gasket 18. As seen in FIGS. 7a and 7b, the outer surface of sea gasket 18 abuts the inner surface of compression ring 16 so that each respective edge is substantially in the same cylindrical projection.

As noted above, a plurality of securing posts 31 are provided and pass through each of the respective plurality of receiving holes on lip seal flange attachment 12, compression ring 16 and sea gasket 18. Each securing post 31 passes through a washer 33 (FIGS. 2 and 9) that abuts the upper surface of compression ring 16 and is threadingly received by a corresponding receiving nut 32 engaging washer 40 and abutting the lower surface of lip seal flange attachment 12, thereby being parallel to axis A of propeller shaft 11. The engagement of securing posts 31 with securing nuts 32 will secure lip seal flange attachment 12, compression ring 16 and sea gasket 18 together so that each moves together in a single integral-like fashion.

Seal housing 14 is best viewed in FIGS. 2, 7a, 7b, 8a and 8b. Seal housing 14 is a rigid structure and comprises an annular outer wall 46, a hose barb 44, a lip seal 52 and a bearing 54. Lip seal 52 is annular and defines a cavity that is aligned with and communicates with the bore defined by inner surface 26 of lip seal flange attachment 12 through which passes propeller shaft 11. Lip seal 52 comprises a lipped edge 53 that directly and securely abuts propeller shaft 11 as it passes through seal housing 14 thereby creating a tight seal around propeller shaft 11 and preventing the external fluid from entering the hull of the vessel. Lip seal 52 is secured to seal housing 14 by a securing means, such as a spiral retaining ring 50, or any other securing means available in the art. Retaining ring 50 is made of stainless steel or a hard non-metallic, non-corrosive substance which can be shaped for performing its intended purpose.

Figure 8A:
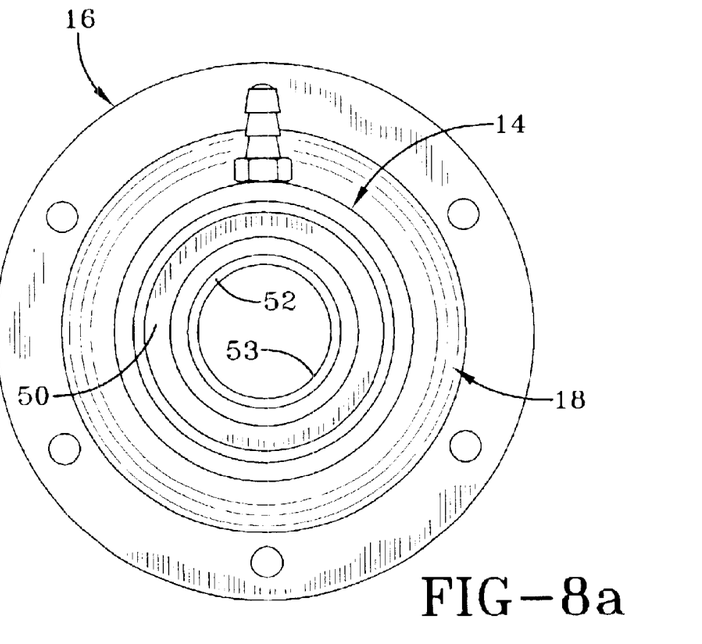
FIG. 8a is a front view of the seal housing of the water-sealing system as shown in FIG. 1.
Figures 8B, 9:
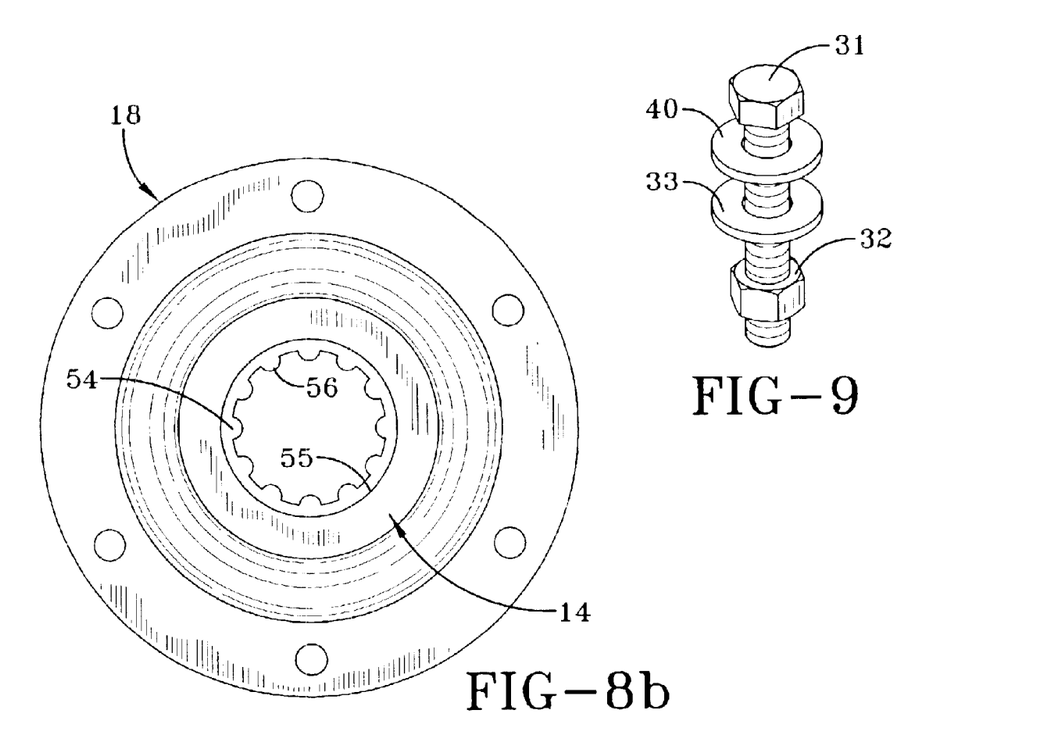
FIG. 8b is a rear view of the seal housing of the water-sealing system as shown in FIG. 1.
FIG. 9 is a perspective view of a threaded post typically used in securing the individual members of the water-sealing system as shown in FIG. 1 together.

The rear or aft portion of seal housing 14 is best viewed at FIG. 8b. Seal housing 14 further includes a bearing 54 located in the aft end of seal housing 14. Bearing 54 comprises a durable, resilient material that is water resistant, especially to seawater, and non-corrosive, such as a rubber or rubber like material. Bearing 54 comprises an inner surface 55 comprised in turn of a plurality of ribs or ridges 56 that directly abut propeller shaft 11. The diameter of bearing 54 is about the same as that of lip seal 52 thereby allowing the propeller shaft 11 to be aligned in an axis directly parallel to that of shaft seal assembly 10, especially seal housing 14.

As stated supra, seal housing contains a hose barb 44. Hose barb 44 is engaged with seal housing 14 at its outer wall 46 and at a barb hose aperture 45. Hose barb 44 is connectable to a hose for an air vent (not shown) or a water supply (not shown).

Turning now to the operation of shaft sealing device 10, device 10 is inserted onto the propeller drive shaft 11 with the seal housing 14 facing the engine of the vessel and the lip seal attachment flange 12 facing the hull of the vessel. The device 10 is attached to the hull by means of a thru-hull adapter ring (not shown), adapter ring (not shown) or hose adapter (not shown) and stem tube (not shown), but all of which are disclosed in U.S. Pat. No. 5,639,098 (MacDonald), which is incorporated herein by reference. Each of them extends from the exterior of the hull, through the hull, or from an opening on the interior side of the hull, and is connected to an adapter ring such as by a threading engagement of a plurality of screw threads of the adapter ring and the thru-hull adapter ring or the like. In an alternative embodiment, device 10 and hull are integrally formed thereby having device 10 and hull as a single unit.

Lip seal flange attachment 12 is attached to compression ring 16 by means of a plurality of longitudinally extending threaded screws or posts 31 therethrough and having sea gasket foot 38 therebetween. Threaded screws or posts 31 are fastened in place by a plurality of securing means, such as a flat washer 33 and threaded securing nut 35 therebetween.

Once device 10 is mounted it should be adjusted to align axis A of the device 10 with the axis of propeller drive shaft 11. During the operation of the engine, propeller drive shaft 11 rotates and device 10 is stationary because the cylindrical cavity aligned with axis A defined by the above-described components of the device 10 is larger than the outside diameter of the propeller shaft, and the shaft is allowed to rotate freely therein. Bearing 54 contacts and rests against propeller shaft drive 11, allowing lip seal 52 to form a watertight surface with propeller shaft drive 11.

Water entering through the gap between propeller drive shaft 11 and the hull of the vessel passes into the inner cavity of device 10. Much of the water is channeled past lip 39 into a cavity defined between body 36 and foot 38 of sea gasket 18 and cylindrical inner surface of seal housing 14. This water is blocked by foot 38 of sea gasket 18.

Water entering the narrow channel defined between propeller shaft drive 11 and the interior surface of lip seal flange attachment 12 and seal housing 14 is blocked by lip seal 52 formed at the surfaces seal housing 14 and it retaining ring 50.

When the vessel is operating, the forward or rearward thrust of the propeller causes the propeller drive shaft 11 to move, either forwards or backwards, towards the engine, or aft, towards the propeller, along axis A. When the vessel is driven forward, the propeller drive shaft 11 is pushed along axis A towards the engine. This moves the seal housing 14 away from compression ring 16 and lip seal flange attachment 12 and towards the engine, extending convoluted body 36 of sea gasket 18. Sea gasket 18 has enough compressive force to move with propeller drive shaft 11 as propeller drive shaft 11 is operated by the engine. As the propeller drive shaft 11 moves due to operation, seal housing 14 moves with the propeller shaft 11 due to the flexibility and resiliency of sea gasket 18 and both track the motion of propeller drive shaft 11, thereby allowing seal housing 14 to maintain a constant seal throughout the operation of propeller drive shaft 11. Sea gasket 18 connects seal housing 14 to lip seal flange attachment 12 and convoluted body 36 is biased towards each movement of propeller drive shaft 11. Convoluted body 36 of sea gasket 18 is able to be extended or compressed and is able to track the movement of propeller drive shaft 11 in any direction, whether it be forward, backward or in a circular or wobble-like motion.

When the vessel is driven backward, the propeller drive shaft 11 is pulled along axis A towards the propeller. This causes seal housing 14 to move towards the propeller compressing convoluted body 36 of sea gasket 18. As stated earlier, convoluted body 36 is flexible and resilient and compresses to allow seal housing 14 to track the movement of propeller drive shaft 11. It is important that sea gasket 18 has proper flexibility and resiliency so that the pressure between lip seal 52 and propeller drive shaft 11 remains relatively constant thereby maintaining a constant seal therebetween.

What has been described above are preferred aspects of the present invention. It is of course not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, combinations, modifications, and variations that fall within the spirit and scope of the appended claims.

I claim:

1. A shaft seal device for use with a drive shaft extending through an opening in the hull of a vessel to preclude the flow of fluid into the vessel and out of the confines of said device, said shah being rotatable about a generally linear axis, said shaft having a passageway having a central, longitudinal axis for receiving said shaft for rotation therein, comprising:

a rigid seal housing, including part of said passageway, said seal housing having an aft end portion, said seal housing comprising:
a seal for providing a seal around said shaft;
a securing apparatus for securing said seal to said housing; and
a bearing situated at said aft end of said housing for tangentially contacting a shaft extending through the passageway;

a flexible diaphragm for moving in response to axial and/or radial movement of the shaft, said diaphragm operatively connected to said seal housing, thereby allowing said seal housing to move axially and/or radially in response to the axial and/or radial movement of the shaft while maintaining a constant seal around the shaft, said diaphragm comprising:
a substantially annular shaped, flat base having at least one securing hole therethrough;
a body extending from said base, said body comprising a substantially annular neck portion and a substantially annular foot portion operatively connected to the neck portion, said foot portion further comprising a substantially annular lip, contacting a longitudinal surface of said seal housing, thereon for supporting said seal housing, and an extendible convolution disposed between said neck portion and said foot portion, said diaphragm being capable of radial, axial and circular-linear rotational movement;

a connecting apparatus for connecting said diaphragm to said seal housing;

a compression ring being operatively connected to said base of said diaphragm and around said body of said diaphragm, wherein said ring comprises at least one securing hole therethrough and secures said diaphragm in place; and a lip seal flange attachment, including part of said passageway, said lip seal flange attachment being operatively connected to said base of said diaphragm on the opposite side of said base from said compression ring, comprising an annular end tube portion, an annular fore end wall portion and at least one securing hole through said wall portion, wherein said lip seal flange attachment secures said diaphragm in place and serves as a guide for the shaft extending through the passageway.

2. A device according to claim 1 wherein said foot portion has substantially the same outer circumference as said seal housing.

3. A device according to claim 1 wherein each of said compression ring, base of said diaphragm and said wall portion of said lip seal flange attachment have substantially the same outer circumference.

4. A device according to claim 1 wherein each of said lip seal flange attachment, seal housing and compression ring are composed of a durable, non-flexible, water resistant material.

5. A device according to claim 4 wherein said material is resistant to seawater.

6. A device according to claim 5 wherein said material is selected from the group consisting of a thermoplastic, a thermoset, metal, and a fiberglass material.

7. A device according to claim 6 wherein said thermoset material is urethane.

8. A device according to claim 1 wherein said diaphragm is comprised of a flexible, water-resistant, non-corrosive material.

9. A device according to claim 8 wherein said diaphragm is resistant to seawater.

10. A device according to claim 9 wherein said diaphragm is selected from the group consisting of rubber, a thermoplastic and a thermoset.

11. A device according to claim 10 wherein said thermoset is urethane.

12. A device according to claim 1 wherein each of said at least one securing hole of said compression ring, diaphragm and lip seal flange attachment is adapted to receive a rigid securing post therethrough, for securing said base of said diaphragm between said compression ring and said wall end portion of said lip seal flange attachment.

13. A device according to claim 1 wherein said seal housing further includes a hose barb that is operatively connected to a hose for providing an air vent or a water supply.

14. A device according to claim 1 wherein said connecting apparatus connecting said diaphragm to said seal housing is a mini tie lock.

15. A fluid sealing device for sealing fluid from flowing from a propeller drive shaft extending inboard in a vessel, the shaft having a generally linear axis, said device having a shaft-receiving passageway and comprising:
- a rigid seal housing, including part of said passageway, said seal housing having an aft end portion, said seal housing comprising:
  - a seal for providing a seal around said shaft;
  - a securing apparatus for securing said seal to said housing; and
  - a bearing situated at said aft end of said housing for tangentially contacting a shaft extending through the passageway;
- a flexible diaphragm for moving in response to axial and/or radial movement of the shaft, said diaphragm operatively connected to said seal housing, thereby allowing said seal housing to move axially and/or radially in response to the axial and/or radial movement of the shaft while maintaining a constant seal around the shaft, said diaphragm comprising:
- a substantially annular shaped, flat base having at least one securing hole therethrough;
- a body extending from said base, said body comprising a substantially annular neck portion and a substantially annular foot portion, said foot portion further comprising a substantially annular lip, contacting a longitudinal surface of said seal housing, thereon for supporting said seal housing and an extendible convolution disposed between said neck portion and said foot portion;
- a connecting apparatus for connecting said diaphragm to said seal housing;
- a compression ring being operatively connected to said base of said tracking apparatus and around said neck portion of said diaphragm, wherein said ring comprises at least one securing hole therethrough, wherein said compression ring secures said diaphragm in place; and
- a lip seal flange attachment, including part of said passageway, said lip seal flange attachment being operatively connected to said base of said diaphragm on the opposite side of said base from said ring, comprising an annular end tube portion, an annular fore end wall portion and at least one securing hole through said wall portion, wherein said lip seal flange attachment secures said diaphragm in place and serves as a guide for the shaft extending through the passageway.

16. A sealing device mountable to the inside of a hull or bulkhead of a vessel for use with an inboard propeller drive shaft having a generally linear axis and having a seal with a seal surface mounted thereto, said device having a shaft-receiving passageway, said device comprising:
- a rigid seal housing, including part of said passageway, having an aû end portion, said seal housing comprising:
  - a seal for providing a seal around said shaft;
  - a securing apparatus for securing said seal to said seal housing; and
  - a bearing situated at said aft end of said housing for tangentially contacting a shaft extending through the passageway;
- a diaphragm operatively connected to said housing by a cormecting apparatus, thereby allowing said seal housing to move axially and/or radially in response to the axial and/or radial movement of the shaft while maintaining a constant seal around the shaft, said diaphragm comprising:
  - a substantially annular shaped, flat base having at least one securing hole therethrough;
  - a body extending from said base, said body comprising a substantially annular neck portion and a substantially annular foot portion operatively connected to the neck portion, said foot portion further comprising a substantially annular lip, contacting a longitudinal surface of said seal housing, thereon for supporting said housing, and an extendible convolution disposed between said neck portion and said foot portion, said diaphragm being capable of radial, axial and circular-linear rotational movement;
  - a connecting apparatus for connecting said diaphragm to said seal housing;
  - a compression ring being operatively connected to said base of said tracking apparatus and around said body of said diaphragm, wherein said compression ring comprises at least one securing hole therethrough and secures said diaphragm in place; and
  - a lip seal flange attachment, including part of said passageway, said lip seal flange attachment being operatively connected to said base of said diaphragm on a side of said base opposite the side operatively connected to said ring, comprising an annular end tube portion and an annular fore end wall portion and at least one securing hole through said wall portion.

17. A shaft seal device for use with a drive shaft extending through an opening in the hull of a vessel to preclude the flow of fluid into the vessel and out of the confines of said device, said shaft being rotatable about a generally linear axis, said shaft having a passageway having a central, longitudinal axis for receiving said shaft for rotation therein, comprising:
- a rigid seal housing, including part of said passageway, said seal housing having an aft end portion, said seal housing comprising:
- a seal for providing a seal around said shaft;
- a securing apparatus for securing said seal to said housing; and
- a bearing situated at said aft end of said housing for tangentially contacting a shaft extending through the passageway;
- a flexible diaphragm for moving in response to axial and/or radial movement of the shaft, said diaphragm operatively connected to said seal housing, thereby allowing said seal housing to move axially and/or radially in response to the axial and/or radial movement of the shah while maintaining a constant seal around the shaft, said diaphragm comprising:
- a substantially annular shaped, flat base having at least one securing hole therethrough;
- a body extending from said base, said body comprising a substantially annular neck portion and a substantially annular foot portion operatively connected to the neck portion, said foot portion further comprising a substantially annular lip, contacting a longitudinal surface of said seal housing, thereon for supporting said seal housing, and an extendible convolution disposed between said neck portion and said foot portion, said diaphragm being capable of radial, axial and circular-linear rotational movement;
- a connecting apparatus for connecting said diaphragm to said seal housing;
- a compression ring being operatively connected to said base of said diaphragm and around said body of said diaphragm, wherein said ring comprises at least one securing hole therethrough and secures said diaphragm in place; and a lip seal flange attachment, including pm of said passageway, said lip seal flange attachment being operatively connected to said base of said diaphragm on the opposite side of said base from said compression ring, comprising an annular end tube portion, an annular fore end wall portion and at least one securing hole through said wall portion, wherein said lip seal flange attachment secures said diaphragm in place and serves as a guide for the shaft extending through the passageway;

said device being devoid of a seal ring for engaging the end of said seal housing, a shaft clamp fixed to the shaft for holding the seal ring in place to prevent water leakage at the end of said seal housing, an O-ring for preventing water leakage between the seal ring and the shah, a spring for biasing said seal housing axially along the shaft and a spring cover for providing a housing for the spring; the lack of a seal ring, a shah clamp, an O-ring, a spring and a spring cover thereby reducing the length of said sealing device along the axis of the shaft and reducing the time and expense of installing said sealing device on a shah, and or rendering a sealing device practical for smaller water vessels having shaft diameters of less than three inches.

* * * * *